(12) United States Patent
Hatayama

(10) Patent No.: US 10,506,397 B2
(45) Date of Patent: Dec. 10, 2019

(54) WIRELESS APPARATUS

(71) Applicant: Panasonic Intellectual Property Management Co., Ltd., Osaka (JP)

(72) Inventor: Yoshinori Hatayama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/302,275

(22) PCT Filed: May 10, 2017

(86) PCT No.: PCT/JP2017/017623
§ 371 (c)(1),
(2) Date: Nov. 16, 2018

(87) PCT Pub. No.: WO2017/217144
PCT Pub. Date: Dec. 21, 2017

(65) Prior Publication Data
US 2019/0297475 A1  Sep. 26, 2019

(30) Foreign Application Priority Data
Jun. 14, 2016  (JP) .................. 2016-118322

(51) Int. Cl.
*H04W 4/46* (2018.01)
*H04W 4/02* (2018.01)
(Continued)

(52) U.S. Cl.
CPC .............. *H04W 4/46* (2018.02); *G01S 19/03* (2013.01); *H04B 1/3822* (2013.01);
(Continued)

(58) Field of Classification Search
CPC ....... H04W 4/46; H04W 4/026; H04W 4/027; H04W 4/021; H04B 1/3822; G01S 19/03
See application file for complete search history.

(56) References Cited

U.S. PATENT DOCUMENTS 6,985,089 B2 *   1/2006   Liu .................. G08G 1/0965
                                                    340/436
2016/0069702 A1 *  3/2016  Takimoto .......... G01C 21/3644
                                                    701/519
(Continued)

FOREIGN PATENT DOCUMENTS

JP    2006-088819    4/2006
JP    2007-318387    12/2007
(Continued)

OTHER PUBLICATIONS

International Search Report of PCT application No. PCT/JP2017/017623 dated Aug. 1, 2017.

*Primary Examiner* — Nizar N Sivji
(74) *Attorney, Agent, or Firm* — Greenblum & Bernstein, P.L.C.

(57) ABSTRACT

A wireless apparatus mountable to a vehicle includes a transmission function unit, a detector, an acquirer, and a controller. The detector detects a startup of the vehicle. The acquirer acquires start position information of the vehicle at a start timing at which the detector detects the startup of the vehicle. The controller examines whether a start position indicated by the start position information is within a designated region, and determines whether to activate the transmission function unit based on the examination result. Alternatively, the detector detects an operation end of the vehicle, and a startup subsequent to the operation end. The acquirer acquires position information of the vehicle at timings of detecting the operation end and the startup of the vehicle. The controller discriminates whether the distance (Continued)

between the positions indicated by the two pieces of the position information is greater than a threshold, and determines whether to activate the transmission function unit based on the discrimination result.

12 Claims, 8 Drawing Sheets

(51) Int. Cl.
    *G01S 19/03*     (2010.01)
    *H04W 4/021*     (2018.01)
    *H04B 1/3822*     (2015.01)

(52) U.S. Cl.
    CPC ........... *H04W 4/021* (2013.01); *H04W 4/026* (2013.01); *H04W 4/027* (2013.01)

(56) References Cited

U.S. PATENT DOCUMENTS

| | | | |
|---|---|---|---|
| 2017/0345298 A1* | 11/2017 | Tandai | H04W 4/40 |
| 2019/0059071 A1* | 2/2019 | Khoryaev | H04W 4/021 |
| 2019/0163689 A1* | 5/2019 | Stahlin | G06F 16/29 |

FOREIGN PATENT DOCUMENTS

| | | |
|---|---|---|
| JP | 2013-101013 | 5/2013 |
| JP | 2015-177370 | 10/2015 |

\* cited by examiner

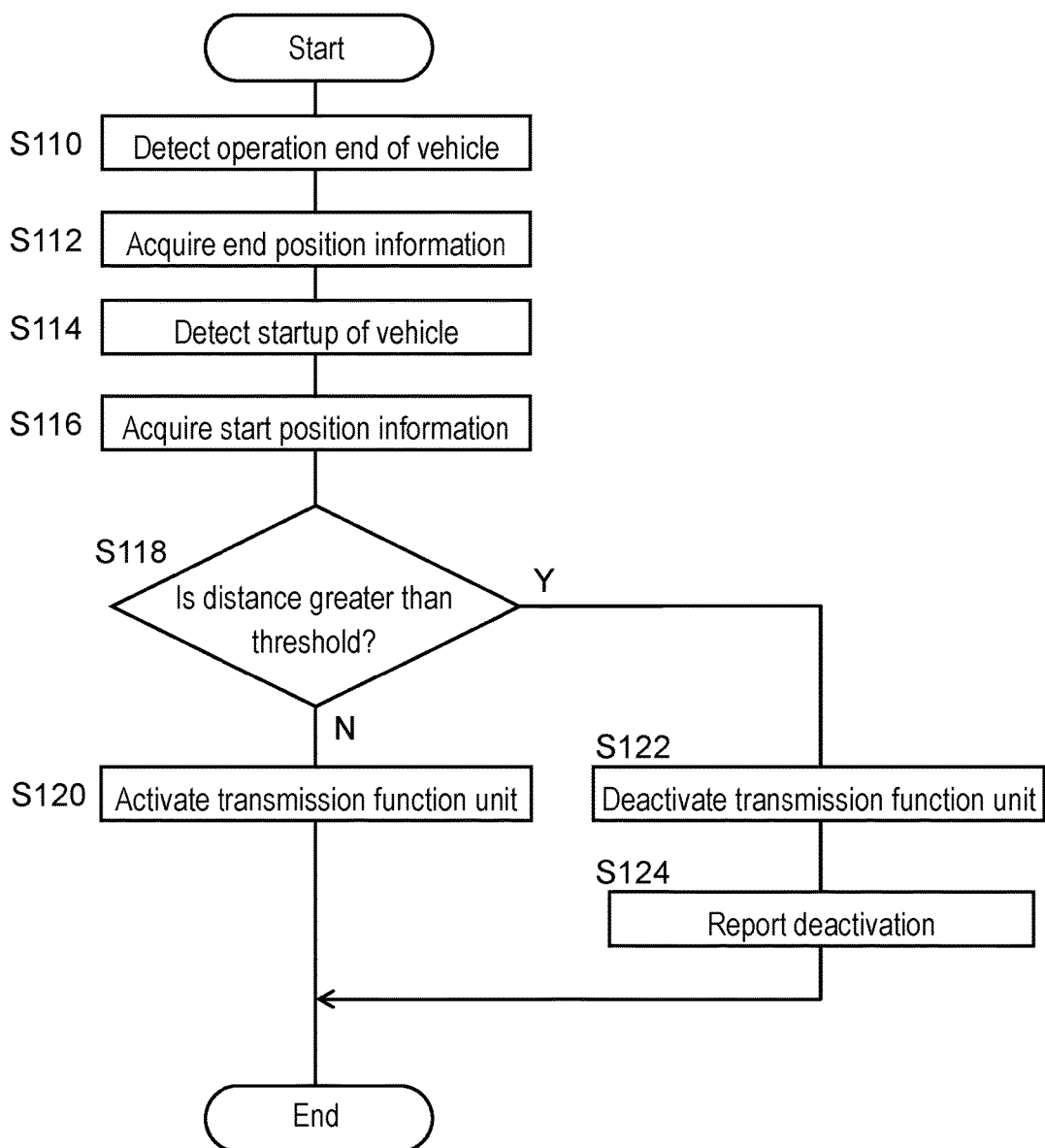

WIRELESS APPARATUS

CROSS-REFERENCE TO RELATED APPLICATIONS

This application is a U.S. national stage application of the PCT International Application No. PCT/JP2017/017623 filed on May 10, 2017, which claims the benefit of foreign priority of Japanese patent application No. 2016-118322 filed on Jun. 14, 2016, the contents all of which are incorporated herein by reference.

TECHNICAL FIELD

The present disclosure relates to a communication technology, and more particularly to a wireless apparatus for transmitting a signal including predetermined information.

BACKGROUND ART

A vehicle-to-vehicle communication system has been developed in which, at an intersection or the like of a poor visibility, a safe driving is supported by a wireless communication of information between vehicles. An infrastructure-to-vehicle communication system has been also developed in which a safe driving is supported by a wireless information communication from an infrastructure to a vehicle via a roadside unit. These wireless communications use radio waves, so that an available frequency band is allocated under a system by the Radio Law. Therefore, in the conventional technology, on the basis of the position and travel direction of the own vehicle, whether or not the vehicle comes into an area that restricts or prohibits the use of a specific frequency band is determined. When the own vehicle is determined to come into such an area, the transmission of radio waves is restricted or stopped (for example, Patent Literature 1).

CITATION LIST

Patent Literature

PTL 1: Unexamined Japanese Patent Publication No. 2015-177370

SUMMARY OF THE INVENTION

When a vehicle including a terminal device to be used in Japan for a vehicle-to-vehicle communication is exported to a country other than Japan and the terminal device transmits a signal in the destination country, this transmission action violates the Radio Law of the destination country. When a vehicle including a terminal device to be used in North America is imported to Japan and the terminal device transmits a signal in Japan, this transmission action violates the Radio Law of Japan. Generally, the terminal device is powered on in response to a startup of the vehicle, and transmits a signal. Therefore, it is desired to determine whether to transmit a signal at startup.

The present disclosure addresses the above-mentioned situation, and provides a technology of determining whether to transmit a signal at startup of a vehicle.

A first wireless apparatus of the present disclosure is mountable to a vehicle, and includes a transmission function unit, a detector, an acquirer, and a controller. The detector detects a startup of a vehicle. The acquirer acquires start position information of the vehicle at a start timing at which the detector detects the startup of the vehicle. The controller examines whether or not a start position indicated by the start position information is within a designated region, and determines whether to activate the transmission function unit based on a result of the examination.

A second wireless apparatus of the present disclosure is mountable to a vehicle, and includes a transmission function unit, a detector, an acquirer, and a controller. The detector detects an operation end of the vehicle, and detects a startup of the vehicle subsequent to the operation end. The acquirer acquires end position information of the vehicle at an end timing at which the detector detects the operation end. The acquirer also acquires start position information of the vehicle at the start timing at which the detector detects the startup of the vehicle. When a distance between an end position indicated by the end position information acquired by the acquirer and a start position indicated by the start position information is a threshold or smaller, the controller activates the transmission function. When the distance is greater than the threshold, the controller deactivates the transmission function.

BRIEF DESCRIPTION OF DRAWINGS

FIG. 8 is a flowchart of a transmission procedure by a terminal device in accordance with a third exemplary embodiment of the present disclosure.

DESCRIPTION OF EMBODIMENTS

Figure 1:
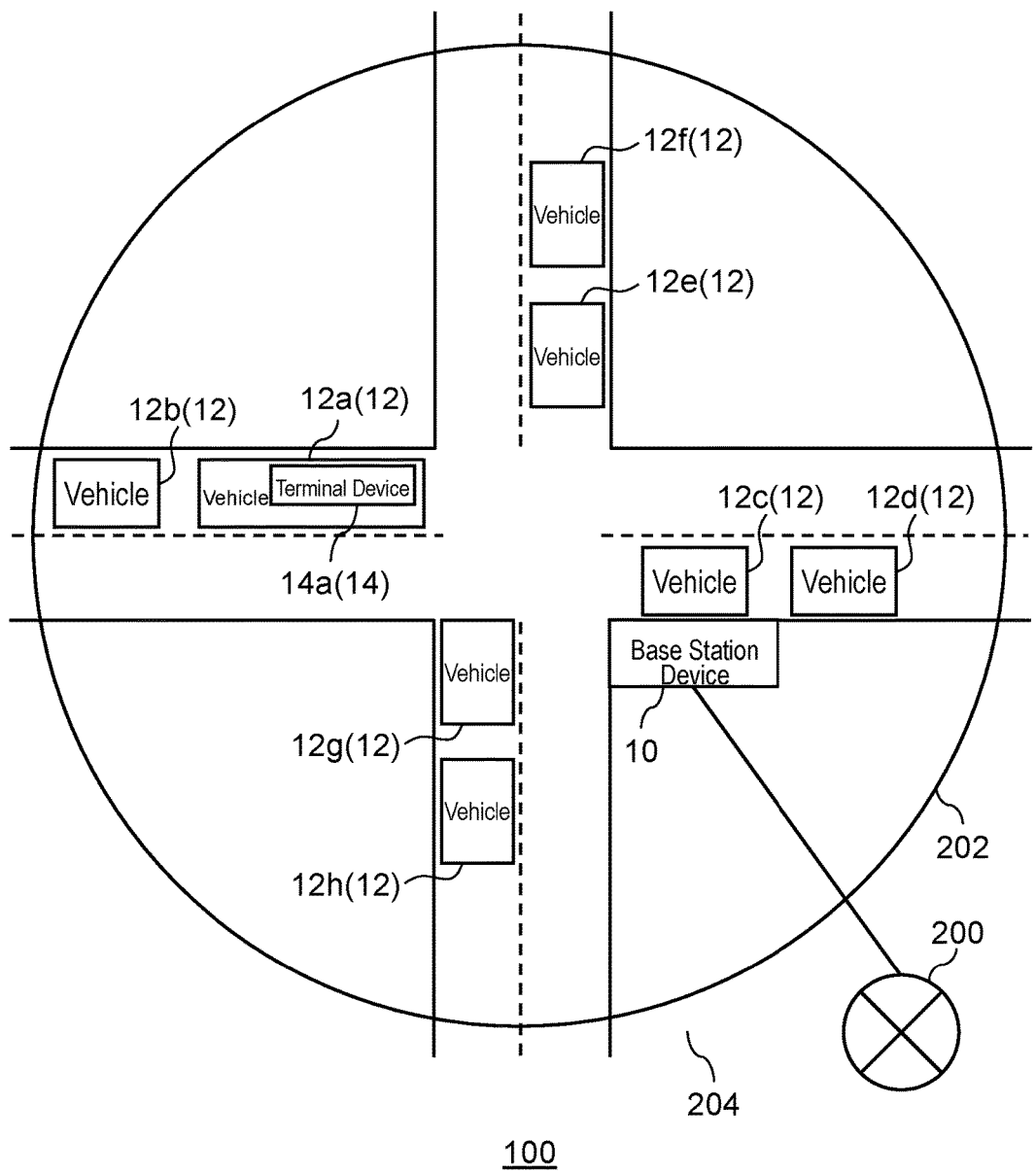
FIG. 1 is a configuration diagram of a communication system in accordance with a first exemplary embodiment of the present disclosure.

Prior to the descriptions of the exemplary embodiments of the present disclosure, an overview of a communication system in accordance with the present disclosure is described. Each of various exemplary embodiments of the present disclosure relates to a communication system that executes a vehicle-to-vehicle communication between terminal devices mounted on vehicles, and also executes an infrastructure-to-vehicle communication from a base station device installed at an intersection or the like to a terminal device. Such communication systems are also called intelligent transport systems (ITS). In each of those communication systems, similarly to a wireless local area network (LAN) complying with IEEE802.11 Standard or the like, an access control function called a carrier sense multiple access with collision avoidance (CSMA/CA) is used. Therefore, the same wireless channel is shared by a plurality of terminal devices. In the ITS, information must be transmitted to an unspecified number of terminal devices. In order to efficiently execute such a transmission, each of those communication systems broadcast-transmits a packet signal.

In other words, in the vehicle-to-vehicle communication, a terminal device broadcast-transmits a packet signal storing information of the position, speed, and travel direction of a vehicle. Another terminal device receives the packet signal, and recognizes an approach or the like of a vehicle on the basis of the above-mentioned information stored in the packet signal. In order to reduce the interference between the infrastructure-to-vehicle communication and the vehicle-to-vehicle communication, the base station device repeatedly defines a frame including a plurality of sub-frames. In the infrastructure-to-vehicle communication, the base station device selects any sub-frame from the plurality of sub-frames. The base station device broadcast-transmits the packet signal storing control information or the like in the period of the head portion of the selected sub-frame.

The control information includes information about the period (hereinafter referred to as "infrastructure-to-vehicle transmission period") in which the base station device broadcast-transmits the packet signal. The terminal device specifies the infrastructure-to-vehicle transmission period on the basis of the control information. Then, the terminal device broadcast-transmits the packet signal in a carrier sense multiple access (CSMA) method in a period (hereinafter referred to as "vehicle-to-vehicle transmission period") other than infrastructure-to-vehicle transmission period. As a result, the infrastructure-to-vehicle communication and vehicle-to-vehicle communication are time-division-multiplexed. A terminal device existing on the outside of the area formed by the base station device broadcast-transmits the packet signal in the CSMA method regardless of the configuration of the frame.

A frequency band available in such communication systems is provided by the Radio Law, and the frequency band generally changes on the country-by-country basis. Furthermore, the communication protocol changes on the country-by-country basis. Therefore, when a vehicle including a terminal device to be used in Japan is exported to a country other than Japan and the terminal device transmits a signal in the destination country, this transmission action violates the Radio Law of the destination country. When a vehicle including a terminal to be used in a country other than Japan is imported to Japan and the terminal device transmits a signal in Japan, this transmission action violates the Radio Law of Japan. In order to suppress the occurrence of such a situation, the terminal devices in accordance with the exemplary embodiments execute predetermined processing. Hereinafter, a terminal device to be used in Japan is described mainly, but similar processing may be executed in a terminal device to be used in a country other than Japan.

First Exemplary Embodiment

FIG. 1 shows a configuration of communication system 100 in accordance with a first exemplary embodiment of the present disclosure. FIG. 1 corresponds to a bird's-eye view when an intersection is viewed from above. Communication system 100 includes base station device 10, vehicle 12a, vehicle 12b, vehicle 12c, vehicle 12d, vehicle 12e, vehicle 12f, vehicle 12g, and vehicle 12h collectively referred to as vehicles 12, and network 200. This drawing shows only terminal device 14a mounted on vehicle 12a, but each vehicle 12 includes one terminal device 14. Area 202 is formed around base station device 10, and outside-area 204 is formed on the outside of area 202.

In FIG. 1, a road to the right and left direction (horizontal direction in FIG. 1) crosses a road to the up and down direction (perpendicular direction in FIG. 1) at the center portion. Here, the crossing portion of the two roads is an "intersection". Vehicle 12a and vehicle 12b travel from left to right. Vehicle 12c and vehicle 12d travel from right to left. Vehicle 12e and vehicle 12f travel from top to bottom. Vehicle 12g and vehicle 12h travel from bottom to top. An example of vehicle 12 is an automobile.

In communication system 100, base station device 10 is installed at the intersection. Base station device 10 controls communication between terminal devices 14. Base station device 10 repeatedly generates a frame including a plurality of sub-frames on the basis of a signal received from a global navigation satellite system(s) (GNSS) (not shown) or a frame generated in another base station device 10 (not shown). For example, by dividing a period of "1 sec" shown by the signal received from the GNSS satellite into 10, 10 frames of "100 msec" are generated. It is defined that an infrastructure-to-vehicle transmission period can be set at the head portion of each sub-frame.

Base station device 10 selects a sub-frame for which an infrastructure-to-vehicle transmission period has not been set by another base station device 10, of the plurality of sub-frames in the frame. Furthermore, base station device 10 sets an infrastructure-to-vehicle transmission period at the head portion of the selected sub-frame. Then, base station device 10 broadcast-transmits a packet signal in the set infrastructure-to-vehicle transmission period. Here, base station device 10 may broadcast-transmit a plurality of packet signals in the infrastructure-to-vehicle transmission period. A packet signal includes control information and a payload. Control information includes a sub-frame number or the like for which an infrastructure-to-vehicle transmission period is set. The payload includes accident information, congestion information, and signal information, for example. The data of them is acquired from network 200.

Terminal device 14 is mounted to vehicle 12 and is movable. Upon receiving a packet signal from base station device 10, terminal device 14 estimates that the own device exists in area 202. When terminal device 14 exists in area 202, terminal device 14 generates a frame on the basis of the control information included in the packet signal, especially, information related to the timing at which an infrastructure-to-vehicle transmission period is set, and information related to the frame. As a result, a frame generated by each of the plurality of terminal devices 14 is synchronized with a frame generated by base station device 10. Each of terminal devices 14 executes the CSMA/CA in the vehicle-to-vehicle transmission period, and broadcast-transmits a packet signal. While, when terminal device 14 has not received a packet signal from base station device 10, terminal device 14 estimates that the own device exists in outside-area 204. When the existence in outside-area 204 has been estimated, terminal device 14 executes the CSMA/CA regardless of the configuration of the frame, and broadcast-transmits a packet signal. Furthermore, on the basis of a packet signal received from another terminal device 14, terminal device 14 recognizes an approach or the like of another of vehicles 12 to which another terminal device 14 is mounted.

Figure 2:
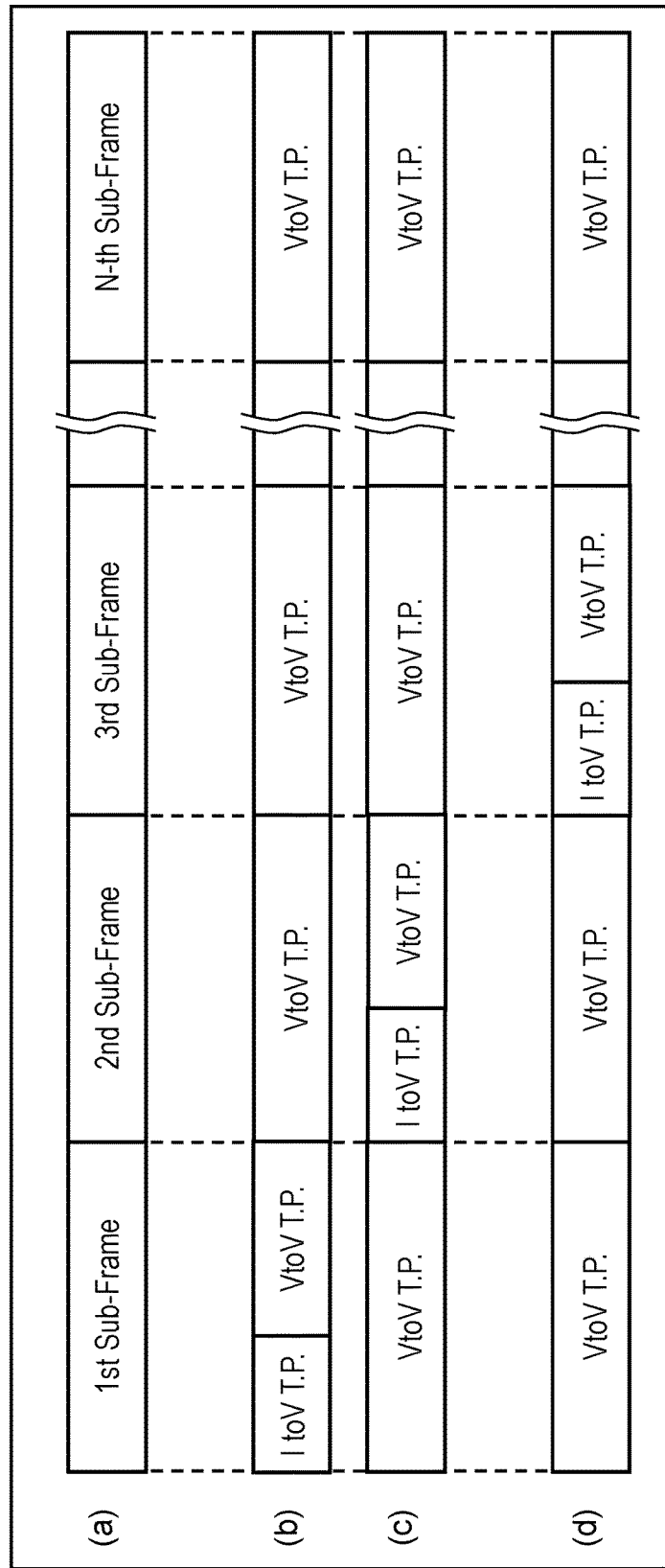
FIG. 2 is a diagram of a format of a frame defined in the communication system shown in FIG. 1.

Next, a frame generated by base station device 10 is described with reference to FIG. 2. FIG. 2 shows a format of a frame defined in communication system 100 shown in FIG. 1. The configuration of a frame is shown in (a) of FIG. 2. The frame includes N sub-frames, of the first sub-frame to the N-th sub-frame. In other words, the frame is formed by a process in which terminal device 14 multiplexes the sub-frames available for broadcast-transmitting for a plurality of times. For example, when the length of the frame is 100 msec and N is 8, sub-frames each having a length of 12.5 msec are defined. Here, N may be other than 8.

The configuration of the frame generated by a first base station device (not shown) is shown in (b) of FIG. 2. The first base station device corresponds to any one of a plurality of base station devices 10. The first base station device sets an infrastructure-to-vehicle transmission period (ItoV T. P.) at the head portion of the first sub-frame. Here, the infrastructure-to-vehicle transmission period is a period in which base station devices 10 can broadcast-transmit a packet signal. The first base station device sets a vehicle-to-vehicle transmission period (VtoV T.P.) subsequent to the infrastructure-to-vehicle transmission period in the first sub-frame. The vehicle-to-vehicle transmission period is a period in which terminal device 14 can broadcast-transmit a packet signal. Furthermore, the first base station device sets vehicle-to-vehicle transmission periods to the second sub-frame to the N-th sub-frame.

The configuration of the frame generated by a second base station device (not shown) is shown in (c) of FIG. 2. The second base station device corresponds to any one of base station devices 10 other than the first base station device. The second base station device sets an infrastructure-to-vehicle transmission period at the head portion of the second sub-frame. Furthermore, the second base station device sets the vehicle-to-vehicle transmission period after the infrastructure-to-vehicle transmission period in the second sub-frame, and sets it in the first sub-frame and the third sub-frame to the N-th sub-frame. The configuration of the frame generated by a third base station device (not shown) is shown in (d) of FIG. 2. The third base station device corresponds to any one of base station devices 10 other than the first and second base station devices. The third base station device sets an infrastructure-to-vehicle transmission period at the head portion of the third sub-frame. Furthermore, the third base station device sets the vehicle-to-vehicle transmission period after the infrastructure-to-vehicle transmission period in the third sub-frame, and sets it in the first sub-frame, the second sub-frame, and the fourth sub-frame to the N-th sub-frame. As discussed above, the plurality of base station devices 10 select sub-frames different from each other, and set an infrastructure-to-vehicle transmission period at the head portion of each of the selected sub-frames.

Figure 3:
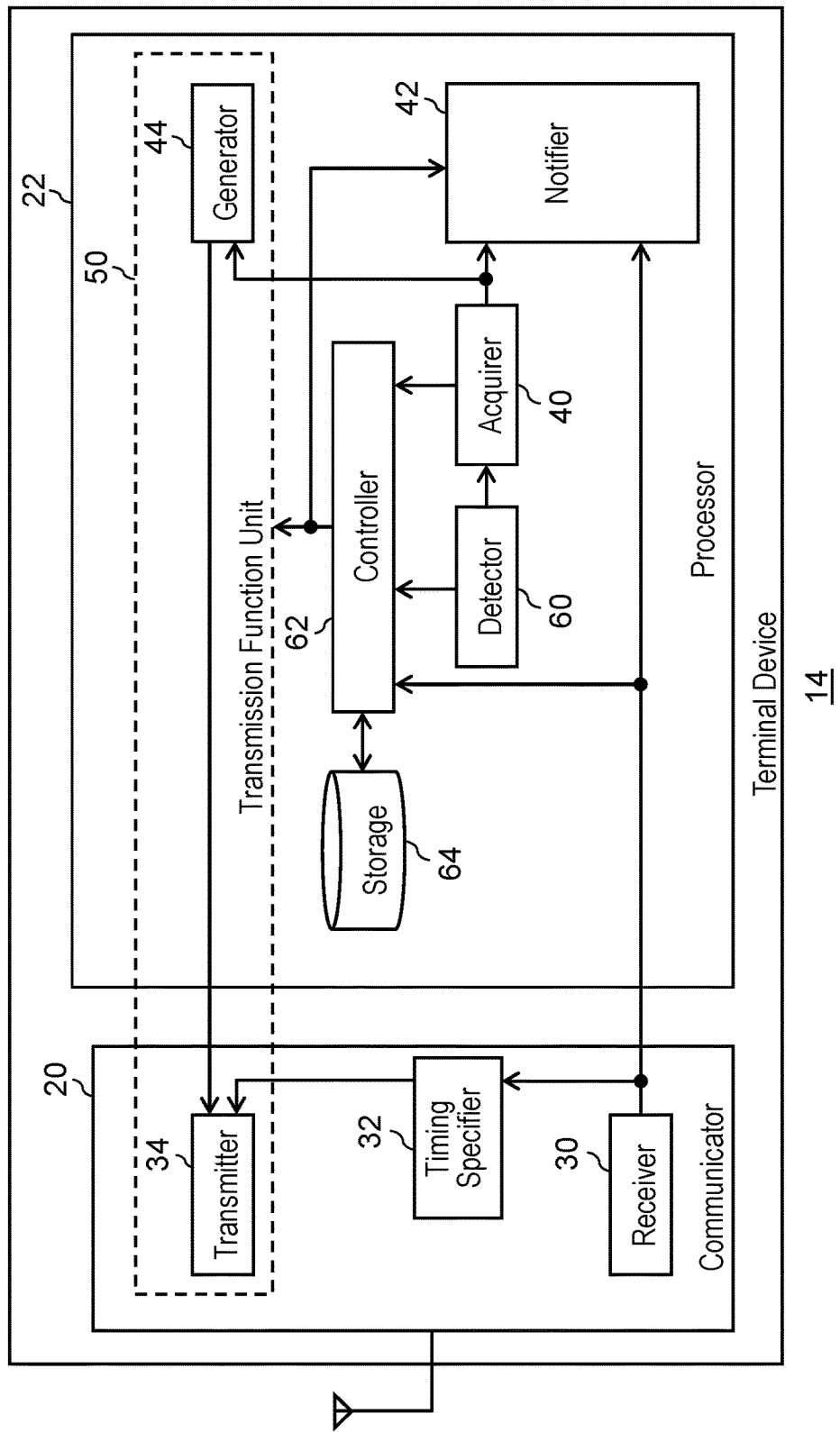
FIG. 3 is a block diagram showing the configuration of a terminal device in the communication system shown in FIG. 1.

FIG. 3 is a block diagram showing the configuration of terminal device 14. Terminal device 14 includes communicator 20 and processor 22. Communicator 20 includes receiver 30, timing specifier 32, and transmitter 34. Processor 22 includes acquirer 40, notifier 42, generator 44, detector 60, controller 62, and storage 64. Here, transmitter 34 and generator 44 are summarized as transmission function unit 50. Hereinafter, (1) basic processing of terminal device 14 and (2) processing at startup of vehicle 12 shown in FIG. 1 are described.

(1) Basic Processing

Receiver 30 receives, via an antenna, a packet signal from base station device 10 or from terminal device 14 mounted to another of vehicles 12 (hereinafter referred to as "the other vehicle") in FIG. 1. Receiver 30 changes the frequency of the packet signal having the received radio frequency, and generates a packet signal of a baseband. Receiver 30 demodulates the packet signal of the baseband. Communication system 100 adapts to an orthogonal frequency division multiplexing (OFDM) modulation method. Therefore, receiver 30 executes fast Fourier transform (FFT). Furthermore, receiver 30 outputs the demodulation result to processor 22 and to timing specifier 32.

When the demodulation result output from receiver 30 is a packet signal from base station device 10 shown in FIG. 1, timing specifier 32 specifies the timing of the sub-frame in which the infrastructure-to-vehicle transmission period is disposed. At that time, timing specifier 32 estimates that terminal device 14 exists in area 202. On the basis of the information included in the packet signal coming from base station device 10, timing specifier 32 generates a frame synchronized with the frame generated by base station device 10. While, when a packet signal has not been received from base station device 10, timing specifier 32 estimates that terminal device 14 exists in outside-area 204.

When timing specifier 32 has estimated that terminal device 14 exists in area 202, timing specifier 32 selects the vehicle-to-vehicle transmission period. Timing specifier 32 executes the CSMA/CA in the vehicle-to-vehicle transmission period, and determines a transmission timing. While, when timing specifier 32 has estimated that terminal device 14 exists in outside-area 204, timing specifier 32 executes the CSMA/CA without considering the configuration of the frame, and determines a transmission timing. Timing specifier 32 outputs the determined transmission timing to transmitter 34.

Transmitter 34 demodulates the data received from processor 22. Communication system 100 adapts to the OFDM modulation method, so that transmitter 34 executes an inverse fast Fourier transform (IFFT). Furthermore, transmitter 34 changes the frequency of the resultant packet signal of the baseband, and generates a packet signal of the radio frequency. Furthermore, at the transmission timing output from timing specifier 32, transmitter 34 broadcast-transmits the packet signal of the radio frequency from the antenna.

Receiver 30 outputs the demodulation result as discussed above. The demodulation result includes the existing position, travel direction, and travel speed of the other vehicle (hereinafter collectively referred to as "other-vehicle position information") transmitted from another of terminal devices 14 mounted to the other of the vehicles. Furthermore, the demodulation result may include the other-vehicle position information transmitted from base station device 10. Furthermore, the demodulation result includes the identification information for identifying whether the transmission origin of the packet signal received by receiver 30 is base station device 10 or terminal device 14. The position information and identification information of the other vehicle are input to notifier 42.

Acquirer 40 includes a GNSS receiver (not shown), a gyroscope, and a vehicle speed sensor. Acquirer 40 acquires the existing position, travel direction, and travel speed (hereinafter collectively referred to as "own-vehicle position information") of vehicle 12 (hereinafter own vehicle) to which terminal device 14 is mounted. In other words, in FIG. 1, acquirer 40 of terminal device 14a acquires the position information of vehicle 12a. The existing position is indicated using the latitude and longitude. The travel direction is indicated by azimuth, north is set as a reference azimuth (0°), and the clockwise direction is set as a positive angle. A known technology may be used for acquiring these parameters, so that the descriptions are omitted. Acquirer 40 outputs the own-vehicle position information to notifier 42, generator 44, and controller 62.

Notifier 42 acquires the position information and identification information of the other vehicle from receiver 30, and acquires the position information of the own vehicle from acquirer 40. When the acquired information satisfies a support need condition, notifier 42 determines the execution of the support. The support need condition is set for each drive support. For example, it is determined that the support need condition for a right-turn collision prevention corresponds to the case that the following items (i) to (iv) are satisfied:

(i) the speed of the own vehicle is a predetermined speed or lower;

(ii) the right winker of the own vehicle is in the ON state;

(iii) the own vehicle and the other vehicle pass each other, in the positional relationship; and (iv) the own vehicle and the other vehicle run into each other within a predetermined time period.

It is determined that the support need condition for a crossing collision prevention corresponds to the case that the following items (i) to (ii) are satisfied:

(i) the own vehicle and the other vehicle cross each other, in the positional relationship; and (ii) the own vehicle and the other vehicle run into each other within a predetermined time period.

When the execution of the support is determined, notifier 42 issues an alarm. The alarm is issued by at least one of display and sound. When controller 62 has deactivated transmission function unit 50, notifier 42 notifies the user of the deactivation of transmission function unit 50 (described later).

Generator 44 receives the position information of the own vehicle from acquirer 40. Generator 44 generates data including the position information of the own vehicle, and outputs the generated data to transmitter 34.

(2) Processing at Startup of Vehicle 12

Detector 60 is connected to an electronic control unit (ECU) via a controller area network (CAN) (neither of them is shown). When an engine or a motor mounted to vehicle 12 starts up, a signal (hereinafter referred to as "start signal") indicating the startup is output from the ECU to detector 60. Detector 60 detects a startup of vehicle 12 by detecting the start signal. Detector 60 outputs a detection result of the startup to controller 62 and acquirer 40. Acquirer 40 acquires the position information of the own vehicle. Especially, at the timing (hereinafter referred to as "start timing") at which detector 60 detects the startup, acquirer 40 acquires the position information (hereinafter referred to as "start position information") of the own vehicle. Acquirer 40 outputs the start position information to controller 62 and the like.

Controller 62 receives the detection result of the startup of vehicle 12 from detector 60. Furthermore, controller 62 receives the start position information output from acquirer 40. Controller 62 refers to the designated region stored in storage 64, and discriminates (or examines) whether or not the position (hereinafter referred to as "start position") of the own vehicle indicated by the start position information is within the designated region. Here, as the information of the designated region, a predetermined area of assumed specification is indicated by the range in the latitude and longitude. For example, the case where the start position is within the designated region means that the start position is in Japan. The case where the start position is not within the designated region means that start position is outside Japan.

On the basis of the discrimination (or examination) result whether or not the start position is within the designated region, controller 62 determines whether to activate transmission function unit 50. Specifically, controller 62 activates transmission function unit 50 when the start position is within the designated region. Controller 62 deactivates transmission function unit 50 when the start position is outside the designated region. When transmission function unit 50 is activated, generator 44 and transmitter 34 execute the above-mentioned processing. When transmission function unit 50 is deactivated, generator 44 and transmitter 34 do not execute the above-mentioned processing, and hence transmitter 34 does not transmit a packet signal. Regardless of whether or not transmission function unit 50 is activated, receiver 30 is activated. When transmission function unit 50 is deactivated, however, receiver 30 may be also deactivated. When controller 62 deactivates transmission function unit 50, notifier 42 notifies the user of the deactivation of transmission function unit 50. Furthermore, when controller 62 has discriminated that the start position is outside the designated region, controller 62 activates transmission function unit 50. When controller 62 has discriminated that the start position is within the designated region, controller 62 may deactivate transmission function unit 50.

As discussed above, when vehicle 12 starts up, transmission function unit 50 of terminal device 14 is activated or deactivated depending on whether or not the start position of vehicle 12 is within the designated region. After the completion of such processing, the following processing may be executed in relation to the activation or deactivation of transmission function unit 50 of terminal device 14. Hereinafter, (2-1) processing executed when transmission function unit 50 is deactivated and (2-2) processing executed when transmission function unit 50 is activated are described.

(2-1) Processing Executed when Transmission Function Unit 50 is Deactivated

In this case, it is assumed that, although transmission function unit 50 must be activated, transmission function unit 50 is deactivated. For example, such situation occurs when, although terminal device 14 exists in Japan, terminal device 14 is erroneously determined to exist in a country other than Japan. When receiver 30 has received a packet signal from the other of terminal devices 14 or base station device 10, receiver 30 demodulates the packet signal. In other words, upon receiving a packet signal complying with the Japanese Radio Law, receiver 30 demodulates the packet signal. Receiver 30 outputs a demodulation result to controller 62. The demodulation result is the position information and the identification information of the other vehicle included in the packet signal.

When the identification information indicates base station device 10, controller 62 activates transmission function unit 50. When the identification information indicates other terminal devices 14, controller 62 counts the number of pieces of acquired identification information. For example, terminal device 14 sometimes receives a signal from other terminal devices 14 violating the Radio Law. Therefore, when the counted number of pieces of identification information is a predetermined number or more, controller 62 activates transmission function unit 50. The predetermined number may be set at any number as long as the number is two or more. Thus, the restriction of transmission function unit 50 is released, which has been deactivated.

(2-2) Processing Executed when Transmission Function Unit 50 is Activated

Hereinafter, it is assumed that vehicle 12 crosses a national border during its travel. In this case, an action of transmitting a signal from terminal device 14 complies with the Radio Law of the country in which vehicle 12 starts up, but can violate the Radio Law of another country across the national border. Acquirer 40 acquires the position information of the own vehicle (hereinafter referred to as "present position information") of the own vehicle also after vehicle 12 starts up, and outputs the present position information to controller 62. During activation of transmission function unit 50, controller 62 refers to the information of the designated region stored in storage 64, on the basis of the present position information from acquirer 40, and, controller 62 performs the processing similar to the above-mentioned processing a plurality of times at a predetermined interval. In other words, during the activation of transmission function unit 50, controller 62 discriminates whether the present position information is within the designated region. On the basis of the discrimination result, controller 62 determines whether to activate transmission function unit 50 a plurality of times at a predetermined interval. The predetermined interval may be defined in time or in distance.

Figure 4:
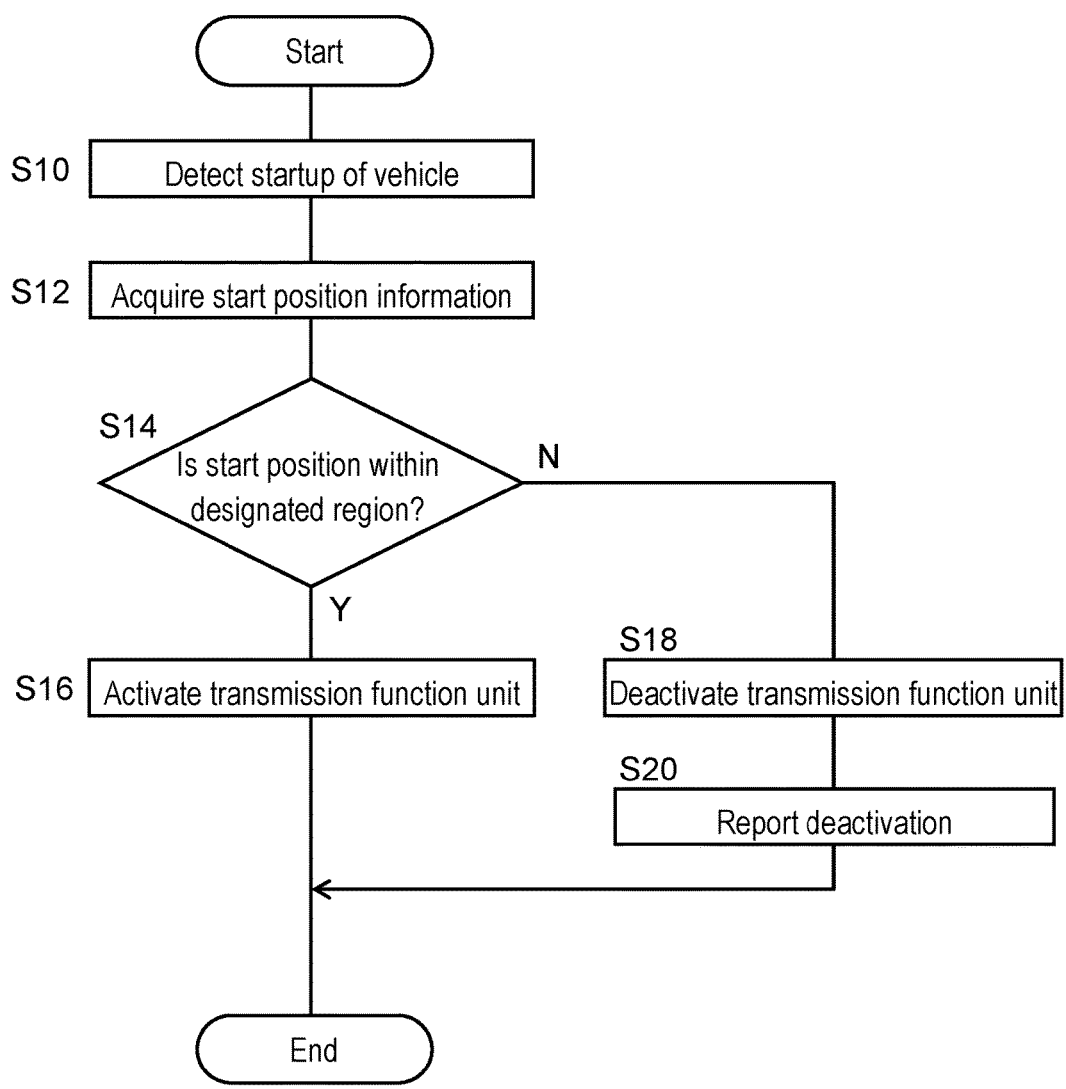
FIG. 4 is a flowchart of a transmission procedure by the terminal device shown in FIG. 3.

The operation of communication system 100 having the above-mentioned configuration is described with reference to FIG. 4 to FIG. 6. FIG. 4 is a flowchart of a transmission procedure by terminal device 14. Detector 60 detects a startup of vehicle 12 (S10). Acquirer 40 acquires start position information (S12). When the start position is within a designated region (Y in S14), controller 62 activates transmission function unit 50 (S16). When the start position is not within a designated region (N in S14), controller 62 deactivates transmission function unit 50 (S18), and notifier 42 reports the deactivation (S20).

Figure 5:
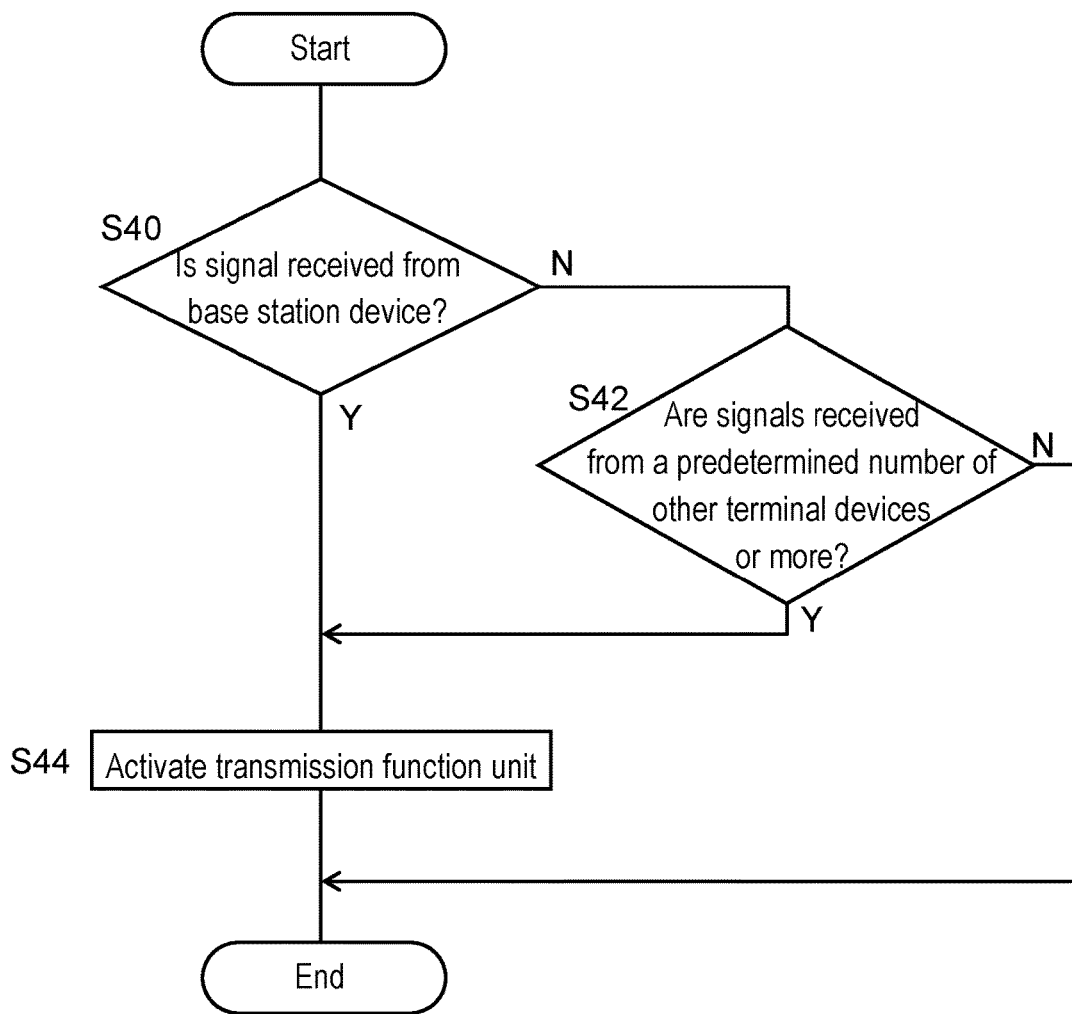
FIG. 5 is a flowchart of another transmission procedure by the terminal device shown in FIG. 3.

FIG. 5 is a flowchart of another transmission procedure by terminal device 14. The transmission procedure shown by FIG. 5 corresponds to the processing executed when transmission function unit 50 is deactivated. When a signal is received from base station device 10 (Y in S40), controller 62 activates transmission function unit 50 (S44). When a signal is not received from base station device 10 (N in S40), and when signals are received from a predetermined number of other terminal devices 14 or more (Y in S42), controller 62 activates transmission function unit 50 (S44). When signals are not received from the predetermined number of other terminal devices 14 or more (N in S42), the processing is completed.

Figure 6:
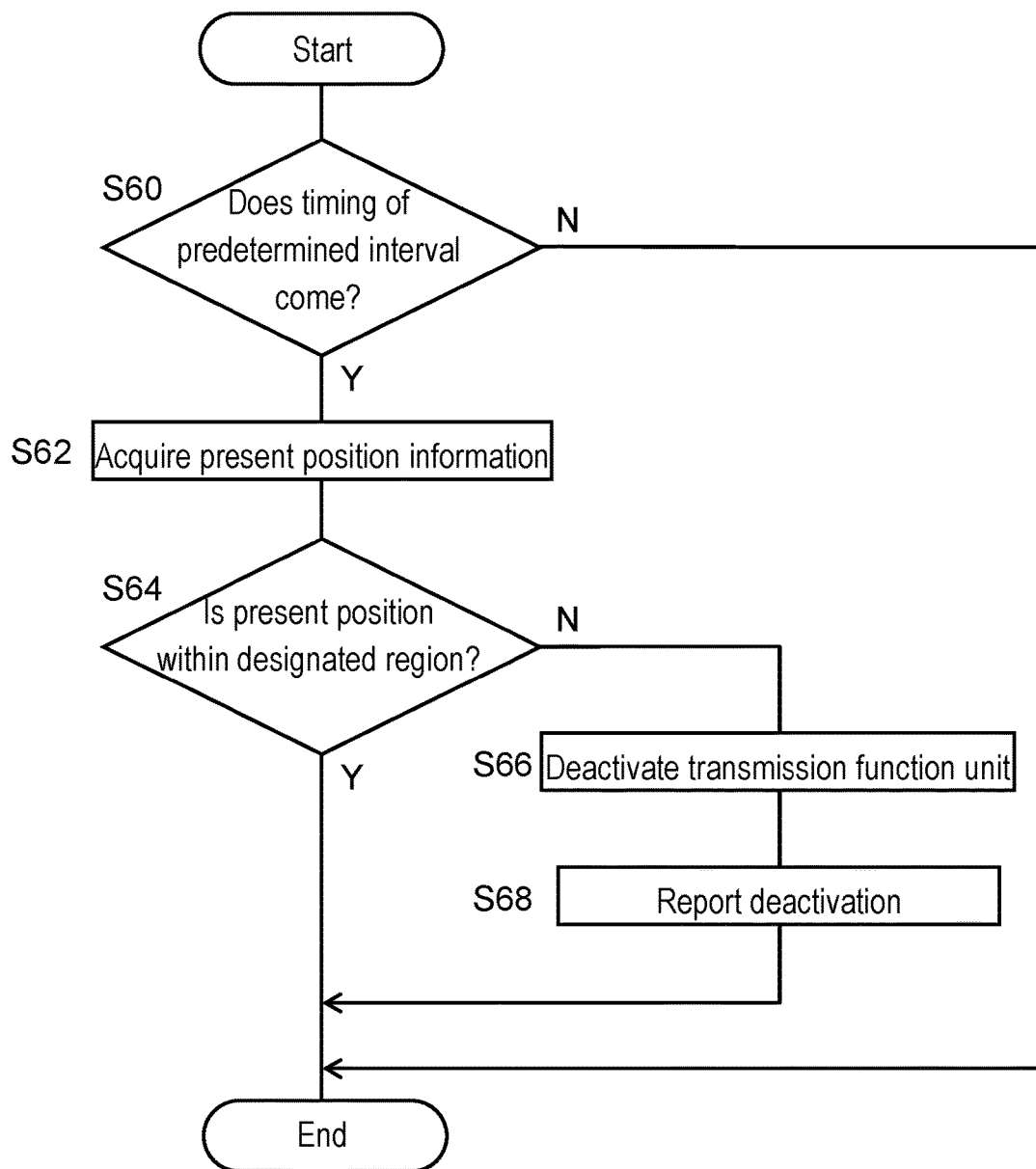
FIG. 6 is a flowchart of yet another transmission procedure by the terminal device shown in FIG. 3.

FIG. 6 is a flowchart showing yet another transmission procedure by terminal device 14. The transmission procedure shown by FIG. 6 corresponds to the processing executed when transmission function unit 50 is activated. When a timing of a predetermined interval comes (Y in S60), acquirer 40 acquires present position information (S62). When the present position is not within the designated region (N in S64), controller 62 deactivates transmission function unit 50 (S66), and notifier 42 reports the deactivation (S68). When the present position is within the designated region (Y in S64), the processing skips S66 and S68. When a timing of the predetermined interval does not come (N in S60), the processing is completed.

As described above, terminal device 14 in accordance with the first exemplary embodiment serves the following advantage.

When terminal device 14 in accordance with the first exemplary embodiment has detected a startup of vehicle 12, terminal device 14 acquires the position information of the position at which vehicle 12 exists. Furthermore, terminal device 14 stores a database indicating a designated region to which a signal can be transmitted, and discriminates whether or not the acquired position information is within the designated region. Here, the designated region is indicated by the range in the latitude and longitude in Japan. When the position information is within the designated region, terminal device 14 activates transmission function unit 50, and transmits a signal. While, when the position information is outside the designated region, terminal device 14 deactivates transmission function unit 50, and does not transmit a signal.

Terminal device 14 in accordance with the first exemplary embodiment includes detector 60, acquirer 40, and controller 62. Detector 60 detects a startup of vehicle 12. Acquirer 40 acquires start position information of vehicle 12 at a start timing at which detector 60 detects the startup of vehicle 12. Controller 62 discriminates whether or not the start position indicated by the start position information is within the designated region, and determines whether to activate transmission function unit 50 on the basis of this discrimination. Thus, whether to transmit a signal can be determined when vehicle 12 starts up. It is determined whether to transmit a signal when vehicle 12 starts up, transmission of a signal of violating the Radio Law can be prevented.

When controller 62 has discriminated that the start position is within the designated region, controller 62 activates transmission function unit 50. When controller 62 has discriminated that the start position is outside the designated region, controller 62 deactivates transmission function unit 50. Thus, transmission function unit 50 is deactivated when the start position is outside the designated region, so that violation of the Radio Law can be prevented. Furthermore, as the information of the designated region to which a signal can be transmitted may be stored, the processing can be simplified.

When controller 62 receives a signal from another wireless apparatus while transmission function unit 50 is in the deactivated state, controller 62 activates transmission function unit 50. For example, another wireless apparatus stands for base station device 10 or a predetermined number of other terminal devices 14 or more. Therefore, this restriction can be released even when transmission function unit 50 is deactivated. Furthermore, when signals are received from the predetermined number of other terminal devices 14 or more, transmission function unit 50 is activated. For example, terminal device 14 sometimes receives a signal from another of terminal devices 14 violating the Radio Law. Even in such a state, terminal device 14 can execute an activation complying with the Radio Law, by activating transmission function unit 50 upon receiving signals from the predetermined number of other terminal devices 14 or more.

Acquirer 40 further acquires the present position information of vehicle 12 after the startup of vehicle 12 until the operation end. In the activated state of transmission function unit 50, controller 62 further discriminates whether or not the present position indicated by the present position information is within the designated region. On the basis of the discrimination result, controller 62 determines whether to activate transmission function unit 50 a plurality of times at a predetermined interval. Thus, whether to activate transmission function unit 50 of the wireless apparatus is determined at a predetermined interval. Therefore, for example, when vehicle 12 crosses a national border during its travel, transmission function unit 50 can be changed from the activation to deactivation.

Second Exemplary Embodiment

Next, a second exemplary embodiment is described. Upon detecting a startup of vehicle 12, terminal device 14 in accordance with the second exemplary embodiment also determines whether to activate transmission function unit 50, based on whether or not the start position is within the designated region. Such processing is executed for each startup of vehicle 12 in the first exemplary embodiment. In the second exemplary embodiment, however, the processing is executed only when a predetermined condition is satisfied. Communication system 100 and terminal device 14 in the second exemplary embodiment are similar to those in FIG.

1 and FIG. 3. In this case, the difference from the first exemplary embodiment is mainly described, and the descriptions of elements similar to those in the first exemplary embodiment are omitted.

When the operation of the engine or the motor mounted on vehicle 12 is completed, a signal (hereinafter referred to as "operation end signal") indicating the operation end is output from the ECU. Upon detecting the operation end signal, detector 60 detects the operation end of vehicle 12. Here, a timing at which detector 60 detects the operation end is referred to as "end timing". Detector 60 outputs, to controller 62, the detection result of the operation end at the end timing. When the engine or the motor starts up after the operation of the engine or the motor mounted to vehicle 12 is completed, detector 60 receives a start signal from the ECU. Detector 60 detects a startup of vehicle 12 upon acquiring the start signal ("start timing"). In other words, the start timing is subsequent to the end timing. Detector 60 outputs, to controller 62, the detection result of the startup at the start timing.

Acquirer 40 acquires the start position information, and acquires position information (hereinafter referred to as "end position information") of the own vehicle at the end timing. Acquirer 40 outputs the start position information and the end position information to controller 62 and the like.

Upon receiving the end position information from acquirer 40, controller 62 makes storage 64 store the end position information. When the start position information is output from acquirer 40, controller 62 extracts the end position information from storage 64, and calculates the distance between the start position and the position (hereinafter referred to as "end position") of the own vehicle indicated by the end position information. A known technology may be used for calculating the distance, the descriptions are omitted. When the distance is greater than a threshold, controller 62 executes the above-mentioned processing for determining whether to activate transmission function unit 50. In other words, the state in which the distance is greater than the threshold corresponds to the above-mentioned "predetermined condition". Here, the threshold is set at the distance in which a movement between Japan and North America can be detected, for example.

On the other hand, when the distance is equal to the threshold or smaller, controller 62 does not determine whether to activate transmission function unit 50 and keeps the state before the operation end of vehicle 12. In other words, when transmission function unit 50 is activated during the operation of vehicle 12, controller 62 activates transmission function unit 50. On the other hand, when transmission function unit 50 is deactivated during the operation of vehicle 12, controller 62 deactivates transmission function unit 50.

Figure 7:
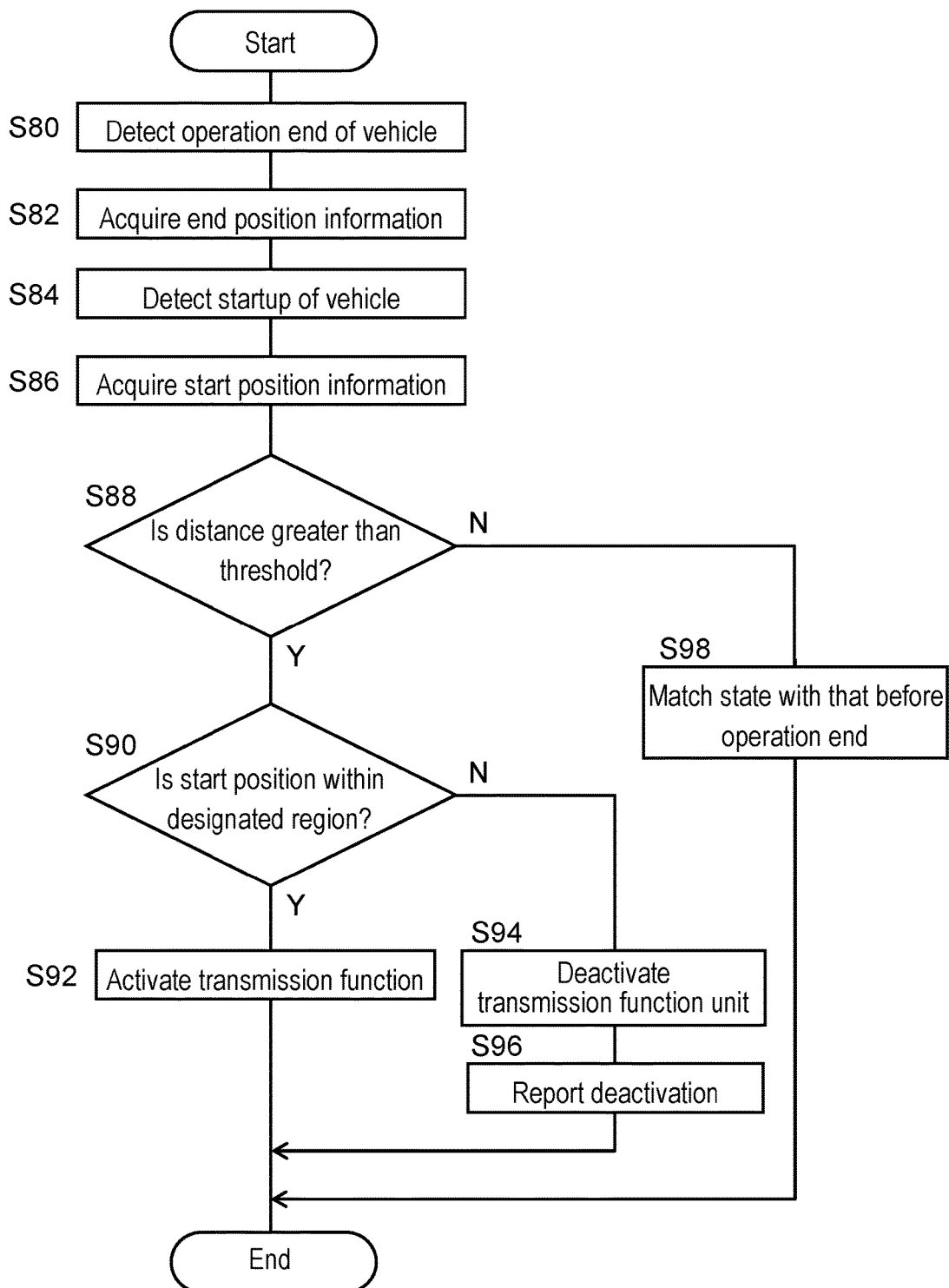
FIG. 7 is a flowchart of a transmission procedure by a terminal device in accordance with a second exemplary embodiment of the present disclosure.

The operation of communication system 100 having the above-mentioned configuration is described with reference to FIG. 7. FIG. 7 is a flowchart showing a transmission procedure by terminal device 14 in accordance with the present exemplary embodiment. Detector 60 detects the operation end of vehicle 12 (S80). Acquirer 40 acquires end position information (S82). Detector 60 detects a startup of vehicle 12 (S84). Acquirer 40 acquires start position information (S86). In the case where the distance between the start position and the end position is greater than the threshold (Y in S88), when the start position is within the designated region (Y in S90), controller 62 activates transmission function unit 50 (S92). When the start position is not within the designated region (N in S90), controller 62 deactivates transmission function unit 50 (S94) and notifier 42 reports the deactivation (S96). In the case where the distance between the start position and the end position is equal to the threshold or smaller (N in S88), controller 62 matches the activation or deactivation with the state before the operation end of vehicle 12 (S98).

Thus, terminal device 14 in accordance with the second exemplary embodiment serves the following advantage.

Detector 60 further detects the operation end of vehicle 12. Acquirer 40 acquires end position information of vehicle 12 at the end timing at which detector 60 detects the operation end. When the distance between the end position indicated by the end position information and the start position at the start timing subsequent to the end timing is greater than a threshold, controller 62 executes the processing of determining whether to activate transmission function unit 50. Thus, when the distance between the start position and the end position is greater than the threshold, controller 62 executes the processing of determining whether to activate transmission function unit 50. Therefore, the execution frequency of the processing can be reduced. Furthermore, when the distance between the start position and the end position is equal to the threshold or smaller, the processing of determining whether to activate transmission function unit 50 is not executed. Therefore, the time period from the startup of terminal device 14 to the transmission of a signal can be reduced.

Third Exemplary Embodiment

Next, a third exemplary embodiment is described. Upon detecting a startup of vehicle 12, terminal device 14 in accordance with the third exemplary embodiment determines whether to activate transmission function unit 50 on the basis of the distance between a start position and an end position. Communication system 100 and terminal device 14 in the third exemplary embodiment are similar to those in FIG. 1 and FIG. 3. In this case, the difference from the first and second exemplary embodiments is mainly described, and the descriptions of elements similar to those in the first and second exemplary embodiment are omitted.

When the distance between the end position and the start position of the own vehicle is greater than a threshold, controller 62 determines whether to activate transmission function unit 50. Specifically, when the distance is equal to the threshold or smaller, controller 62 activates transmission function unit 50. When the distance is greater than the threshold, controller 62 deactivates transmission function unit 50. The threshold is set at the distance in which a movement between Japan and North America can be detected, for example.

An operation of communication system 100 having the above-mentioned configuration is described. FIG. 8 is a flowchart showing a transmission procedure by terminal device 14 in accordance with the present exemplary embodiment. The processing of S110 to S116 is similar to that in S80 to S86 in FIG. 7 of the second exemplary embodiment, so that the description for the processing is omitted. When the distance between the start position and the end position is equal to the threshold or smaller (N in S118), controller 62 activates transmission function unit 50 (S120). When the distance between the start position information and the end position information is greater than the threshold (Y in S118), controller 62 deactivates transmission function unit 50 (S122) and notifier 42 reports the deactivation (S124).

Thus, terminal device 14 in accordance with the third exemplary embodiment serves the following advantage.

Terminal device 14 in accordance with the third exemplary embodiment is a wireless apparatus mountable to vehicle 12, and includes detector 60, acquirer 40, and controller 62. Detector 60 detects the operation end of vehicle 12, and detects a startup of the vehicle subsequent to the operation end. Acquirer 40 acquires end position information of vehicle 12 at an end timing at which detector 60 detects the operation end, and acquires end position information of vehicle 12 at a start timing at which startup detector 60 detects the startup. When the distance between the end position indicated by the end position information and the start position indicated by the start position information, both acquired by acquirer 40, is equal to the threshold or smaller, controller 62 activates transmission function unit 50. When the distance is greater than the threshold, controller 62 deactivates transmission function unit 50.

Thus, controller 62 activates transmission function unit 50 when the distance between the start position and the end position is equal to the threshold or smaller. Controller 62 deactivates transmission function unit 50 when the distance is greater than the threshold. Thus, whether to transmit a signal can be determined when vehicle 12 starts up. It is determined whether to transmit a signal when vehicle 12 starts up, so that transmission of a signal of violating the Radio Law can be prevented. Furthermore, when the distance is greater than the threshold, transmission function unit 50 is deactivated. Therefore, violation of the Radio Law can be prevented. Furthermore, as the threshold may be stored, the processing can be simplified.

Thus, the present disclosure has been described on the basis of the first exemplary embodiment to third exemplary embodiment. Persons skilled in the art understand that the exemplary embodiments are examples, combination of components or processing processes can include various modified examples, and the modified examples are included in the scope of the present disclosure.

In the first to third exemplary embodiments, controller 62 determines whether to activate transmission function unit 50. However, the present disclosure is not limited to this. For example, in a case where terminal device 14 includes a plurality of types of transmission function units 50 corresponding to the Radio Laws of a plurality of countries, respectively, controller 62 determines the activation of one of transmission function units 50 and determines the deactivation of the others of transmission function units 50. In the present modified example, a signal complying with the Radio Law of each of a plurality of countries can be transmitted.

The configurations of the first to third exemplary embodiments can be achieved by a hardware configuration including a central processor (CPU), a memory, and the other large scale integration (LSI) of any computer, and by a software configuration including programs loaded in the memory. In the first to third exemplary embodiments, function blocks achieved by a combination of them are shown. Therefore, persons skilled in the art can understand that these function blocks can be achieved in various forms including only hardware or a combination of hardware and software.

INDUSTRIAL APPLICABILITY

The present disclosure is useful as a wireless apparatus capable of determining whether to transmit a signal when a vehicle starts up.

REFERENCE MARKS IN THE DRAWINGS 10 base station device
12, 12a, 12b, 12c, 12d, 12e, 12f, 12g, 12h vehicle
14, 14a terminal device
20 communicator
22 processor
30 receiver
32 timing specifier
34 transmitter
40 acquirer
42 notifier
44 generator
50 transmission function unit
60 detector
62 controller
64 storage
100 communication system
200 network
202 area
204 outside-area

The invention claimed is:

1. A vehicle comprising:
a GNSS receiver; and
a wireless communicator,
wherein the GNSS receiver is configured to acquire a position of the vehicle,
wherein the wireless communicator is configured to transmit at least the position of the vehicle to another vehicle,
wherein the wireless communicator transmits the position of the vehicle to the another vehicle when the position of the vehicle is within a region, and the wireless communicator does not transmit the position of the vehicle to the another vehicle when the position of the vehicle is out of the region,
wherein the region corresponds to at least one country,
wherein the GNSS receiver acquires the position of the vehicle when an engine or a motor of the vehicle starts up, and
wherein the wireless communicator does not transmit the position of the vehicle to the another vehicle when the acquired position of the vehicle is out of the region.

2. The vehicle according to claim 1, wherein
the wireless communicator further transmits at least one of a travel speed of the vehicle and a travel direction of the vehicle, to the another vehicle.

3. The vehicle according to claim 1, further comprising a controller,
wherein the controller controls the wireless communicator to transmit the position of the vehicle to the another vehicle when the position of the vehicle is within the region, and the controller controls the wireless communicator not to transmit the position of the vehicle to the another vehicle when the position of the vehicle is out of the region.

4. The vehicle according to claim 1, wherein
the wireless communicator broadcast-transmits the position of the vehicle when the position of the vehicle is within the region.

5. The vehicle according to claim 1, wherein
the vehicle performs a discrimination a plurality of times at a predetermined interval, in the discrimination, the wireless communicator transmitting the position of the vehicle to the another vehicle when the position of the vehicle is within the region, and the wireless communicator not transmitting the position of the vehicle to the another vehicle when the position of the vehicle is out of the region.

6. The vehicle according to claim 1, wherein
the wireless communicator is deactivated when the position of the vehicle is out of the region.

7. A wireless apparatus mountable to a vehicle, the wireless apparatus comprising:
   a GNSS receiver; and
   a wireless communicator,
   wherein the GNSS receiver is configured to acquire a position of the vehicle,
   wherein the wireless communicator is configured to transmit at least the position of the vehicle to another vehicle,
   wherein the wireless communicator transmits the position of the vehicle to the another vehicle when the position of the vehicle is within a region, and the wireless communicator does not transmit the position of the vehicle to the another vehicle when the position of the vehicle is out of the region,
   wherein the region corresponds to at least one country,
   wherein the GNSS receiver acquires the position of the vehicle when an engine or a motor of the vehicle starts up, and
   wherein the wireless communicator does not transmit the position of the vehicle to the another vehicle when the acquired position of the vehicle is out of the region.

8. The wireless apparatus according to claim 7, wherein
the wireless communicator further transmits at least one of a travel speed of the vehicle and a travel direction of the vehicle, to the another vehicle.

9. The wireless apparatus according to claim 7, further comprising a controller,
   wherein the controller controls the wireless communicator to transmit the position of the vehicle to the another vehicle when the position of the vehicle is within the region, and the controller controls the wireless communicator not to transmit the position of the vehicle to the another vehicle when the position of the vehicle is out of the region.

10. The wireless apparatus according to claim 7, wherein
the wireless communicator broadcast-transmits the position of the vehicle when the position of the vehicle is within the region.

11. The wireless apparatus according to claim 7, wherein
the wireless apparatus performs a discrimination a plurality of times at a predetermined interval, in the discrimination, the wireless communicator transmitting the position of the vehicle to the another vehicle when the position of the vehicle is within the region, and the wireless communicator not transmitting the position of the vehicle to the another vehicle when the position of the vehicle is out of the region.

12. The wireless apparatus according to claim 7, wherein
the wireless communicator is deactivated when the position of the vehicle is out of the region.

* * * * *